W. F. O'NEIL.
TIRE BOOT.
APPLICATION FILED MAR. 21, 1914.

1,108,389.

Patented Aug. 25, 1914.

WITNESSES:
Frank R Glove
H. C. Rodgers

INVENTOR
Wm. F. O'Neil
BY
George F Hooper
ATTORNEY

UNITED STATES PATENT OFFICE.

WILLIAM F. O'NEIL, OF KANSAS CITY, MISSOURI.

TIRE-BOOT.

1,108,389.　　　Specification of Letters Patent.　　Patented Aug. 25, 1914.

Application filed March 21, 1914.　Serial No. 826,379.

*To all whom it may concern:*

Be it known that I, WILLIAM F. O'NEIL, a citizen of the United States, residing at Kansas City, in the county of Jackson and State of Missouri, have invented certain new and useful Improvements in Tire-Boots, of which the following is a specification.

This invention relates to tire boots for pneumatic-tired wheels, and my object is to produce a tire boot of simple and cheap construction which is extremely strong and durable and which is of such construction that it will retain its shape until worn out.

With this object in view the invention consists in certain novel and peculiar features of construction and combination of parts as hereinafter described and claimed, and in order that it may be fully understood reference is to be had to the accompanying drawing, in which—

Figure 1:
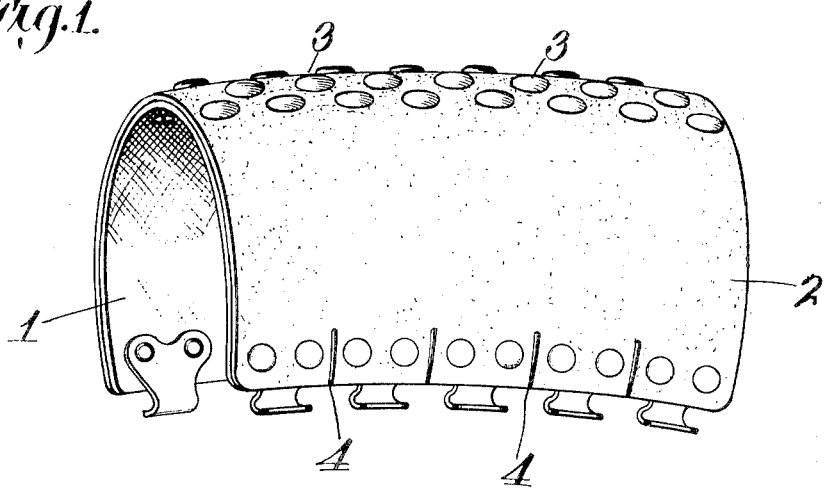
Figure 2:
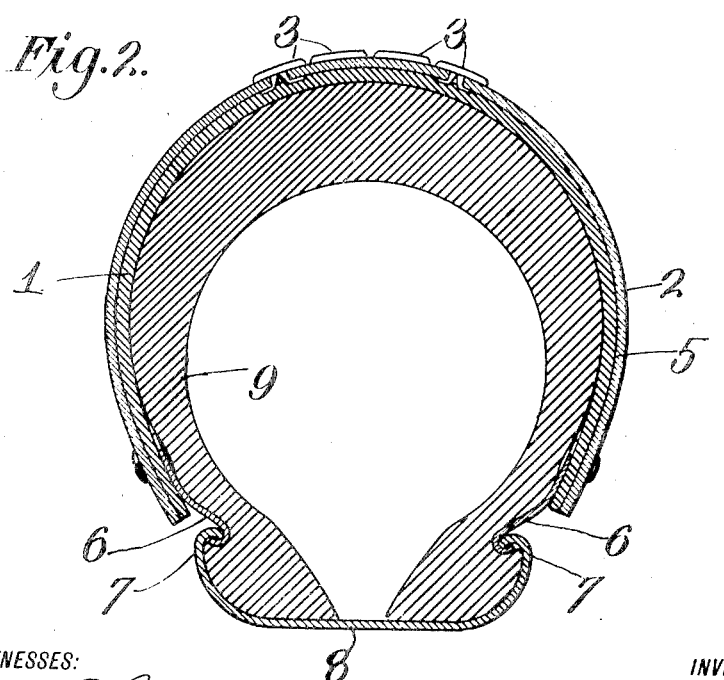

Figure 1, is a perspective view of a tire boot embodying my invention. Fig. 2 is a transverse section of the tire boot as applied to a pneumatic tire.

Heretofore it has been customary to make tire boots of two layers of material, and it has been necessary that both such layers shall be provided with incisions at their longitudinal edges for the purpose of permitting the boot to fit the tire snugly. The necessity for so making the boot was due to the fact that the inside layers or lining of the boot was not previously stretched properly to conform to the tire. I have found in practice that by the use of old tire fabric as a lining for the boot, that is fabric which has constituted a part of an old pneumatic tire and has therefore been stretched by actual service on the road, a boot can be made which is superior to the boots composed of any material which has not been stretched under such service. My invention consists in making a tire boot with an inner lining of stretched tire fabric and an outer layer of chrome leather secured together by acid cured cement and rivets.

1 indicates the inner layer or lining of a tire boot, the said layer or lining being composed of a piece of fabric from an old tire and hence which has been stretched in actual road service. 2 is the outer layer or casing of the boot, the same being of chrome leather because of its durability and strength and along its longitudinal center said casing is studded with steel rivets 3 to act as a wear surface the rivets of such surface preferably extending through the lining of the inner layer of the boot as a double protection against the separation of the layers or lining in the casing at the points where the boot is subjected to the severest strain.

To make the casing or outer layer conform to the properly formed lining of tire fabric, the side edges of the casing must be provided with the customary incisions 4, so that the inner margin of the casing of the boot can be properly shortened to fit snugly upon the lining 1 which through previous use has been shaped to properly fit the tire.

The inner and outer layers or the lining and casing of the boot are secured together by suitable acid cured cement as indicated at 5, it being wellknown that by this process leather can be secured to a tire fabric so as to form practically an integral part thereof.

The boot is adapted to be secured upon the tire in any suitable manner, the preferred construction being to rivet to the side margins of the boot, series of outturned hooks 6, for engagement with the inturned hook margins 7 of the rim 8, of a pneumatic tired wheel, the boot fitting around the tire 9, as shown.

Tire boots of the character hereinbefore described have been generally employed for effecting emergency repairs, but the practice has grown, particularly in the country of employing tire boots as tire protectors. For this reason it has become desirable that the boot shall fit with the utmost nicety and possess the quality of durability in a high degree. Again the ordinary boot which is not composed or provided with a lining of properly stretched material does not at its ends fit the tire with the requisite degree of snugness to guard against sand and dust working between the tire and boot and hence rendering the latter more susceptible to injury by contact with sharp stones or other objects in the roadway.

With a boot as described herein, the trouble last mentioned is not encountered nor will the lining stretch and flare at its ends from the tire after a short or a long period of service, as frequently happens with a boot made of non-stretched material or provided with a non-stretched lining.

From the above description, it will be apparent that I have produced a tire boot possessing the features of advantage enumerated as desirable and I wish it to be understood that while I have illustrated and described the preferred embodiment of the same, I reserve the right to make all changes falling within the spirit and scope of the appended claim.

I claim:

In a pneumatic tire boot composed of an inner layer of tire fabric previously stretched to the shape of a section of a tire, an outer layer of leather permanently cemented to said fabric, incisions in the longitudinal margins of said leather to permit it to be shaped to conform to said fabric, hooks riveted to the side margins of said boot, said rivets passing entirely through said leather and said fabric each hook being riveted at two or more places, and said rivets being in longitudinal alinement.

In testimony whereof, I affix my signature, in the presence of two witnesses.

WILLIAM F. O'NEIL.

Witnesses:
H. C. RODGERS,
G. Y. THORPE.